US012242588B2

(12) United States Patent
Kitanosako (10) Patent No.: US 12,242,588 B2
(45) Date of Patent: Mar. 4, 2025

(54) ELECTRONIC DEVICE AND METHOD

(71) Applicant: CANON KABUSHIKI KAISHA, Tokyo (JP)

(72) Inventor: Hiroki Kitanosako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 17/350,871

(22) Filed: Jun. 17, 2021

(65) Prior Publication Data
US 2021/0406360 A1    Dec. 30, 2021

(30) Foreign Application Priority Data

Jun. 24, 2020 (JP) .................. 2020-108997

(51) Int. Cl.
| | | |
|---|---|---|
| G06F 21/44 | (2013.01) | |
| G06F 1/26 | (2006.01) | |
| G06F 1/3212 | (2019.01) | |
| G06F 13/42 | (2006.01) | |
| G06F 21/85 | (2013.01) | |
| H02J 7/00 | (2006.01) | |
| H04N 23/65 | (2023.01) | |

(52) U.S. Cl.
CPC .............. *G06F 21/44* (2013.01); *G06F 1/266* (2013.01); *G06F 1/3212* (2013.01); *G06F 13/4282* (2013.01); *G06F 21/85* (2013.01); *H02J 7/00045* (2020.01); *H04N 23/65* (2023.01); *G06F 2213/0042* (2013.01)

(58) Field of Classification Search
CPC .................................. G06F 21/44; G06F 21/85
See application file for complete search history.

(56) References Cited

U.S. PATENT DOCUMENTS

| 10,193,350 B2 * | 1/2019 | Tokuda ..................... H02J 1/00 |
| 11,100,255 B1 * | 8/2021 | Eftimie ................. G06F 21/567 |
| 11,561,592 B2 * | 1/2023 | Moritomo ............... G06F 21/85 |

(Continued)

FOREIGN PATENT DOCUMENTS

| JP | 2013127720 A | 6/2013 |
| JP | 2018-097643 A | 6/2018 |
| JP | 2019193533 A | 10/2019 |

OTHER PUBLICATIONS

J. Tian, N. Scaife, D. Kumar, M. Bailey, A. Bates and K. Butler, "Sok: "Plug & Pray" Today—Understanding USB Insecurity in Versions 1 Through C," 2018 IEEE Symposium on Security and Privacy (SP), San Francisco, CA, USA, 2018, pp. 1032-1047. (Year: 2018).*

(Continued)

*Primary Examiner* — Kari L Schmidt
(74) *Attorney, Agent, or Firm* — Canon U.S.A., Inc., IP Division (57) ABSTRACT

An electronic device includes a control unit and a communication unit that is capable of communicating with a power supply device. The control unit determines whether or not a predetermined message relating to an authentication communication is received from the power supply device via the communication unit, and controls the electronic device to limit operation of the electronic device in a case where the predetermined message is received from the power supply device via the communication unit.

12 Claims, 6 Drawing Sheets

(56) References Cited

U.S. PATENT DOCUMENTS

| | | | | |
|---|---|---|---|---|
| 2006/0192015 | A1* | 8/2006 | DiGiovanna | G01R 31/68 |
| | | | | 235/472.02 |
| 2009/0286578 | A1* | 11/2009 | Nagasawa | H04W 52/0277 |
| | | | | 455/574 |
| 2012/0020127 | A1* | 1/2012 | Chen | H02J 9/005 |
| | | | | 363/74 |
| 2012/0092141 | A1* | 4/2012 | Ichihara | B60L 53/305 |
| | | | | 340/12.32 |
| 2014/0189892 | A1* | 7/2014 | Nair | G06F 21/81 |
| | | | | 726/36 |
| 2014/0285318 | A1* | 9/2014 | Audeon | B60L 53/65 |
| | | | | 340/5.61 |
| 2014/0375138 | A1* | 12/2014 | Sako | B60L 53/65 |
| | | | | 307/104 |
| 2015/0171635 | A1* | 6/2015 | Aikawa | H02J 50/12 |
| | | | | 320/108 |
| 2015/0370299 | A1* | 12/2015 | Waters | G06F 1/26 |
| | | | | 713/310 |
| 2016/0154745 | A1* | 6/2016 | Nagai | H04L 9/3228 |
| | | | | 713/193 |
| 2016/0191965 | A1* | 6/2016 | Choi | H04N 21/6334 |
| | | | | 725/31 |
| 2016/0378971 | A1* | 12/2016 | Dunstan | G06F 21/44 |
| | | | | 726/17 |
| 2017/0038810 | A1* | 2/2017 | Ueki | G06F 21/44 |
| 2017/0063126 | A1* | 3/2017 | Haebler | G01R 21/133 |
| 2017/0085084 | A1* | 3/2017 | Daly | G06F 1/3215 |
| 2017/0285722 | A1* | 10/2017 | Kim | G06F 1/3296 |
| 2017/0366026 | A1* | 12/2017 | Todd | H02J 7/00 |
| 2018/0004279 | A1* | 1/2018 | Matsui | G06F 1/3212 |
| 2018/0166886 | A1* | 6/2018 | Ueta | G06F 1/266 |
| 2018/0241096 | A1* | 8/2018 | Kaechi | G06F 1/263 |
| 2018/0254670 | A1* | 9/2018 | Tsukamoto | H04B 5/0037 |
| 2018/0364794 | A1* | 12/2018 | Yi | H03K 17/951 |
| 2019/0131810 | A1* | 5/2019 | Lim | H02J 7/342 |
| 2019/0204890 | A1 | 7/2019 | Kitanosako | |
| 2019/0204895 | A1 | 7/2019 | Kitanosako | |
| 2019/0204896 | A1 | 7/2019 | Kitanosako | |
| 2019/0212795 | A1* | 7/2019 | Moritomo | G06F 1/26 |
| 2020/0004307 | A1 | 1/2020 | Kitanosako | |
| 2021/0034126 | A1 | 2/2021 | Tsujimoto | |
| 2021/0034139 | A1 | 2/2021 | Tsujimoto | |
| 2021/0064736 | A1* | 3/2021 | Lee | H04W 12/06 |
| 2021/0248223 | A1* | 8/2021 | Chippakurthy | G06F 9/541 |
| 2022/0037896 | A1* | 2/2022 | Tao | H02J 7/00032 |
| 2023/0047564 | A1* | 2/2023 | Best | H04L 9/3271 |
| 2023/0402853 | A1* | 12/2023 | Lee | H02J 50/80 |

OTHER PUBLICATIONS

Ding, Fei, et al. "DeepPower: Non-intrusive and deep learning-based detection of IoT malware using power side channels." Proceedings of the 15th ACM Asia conference on computer and communications security. 2020, pp. 33-46. (Year: 2020).*

* cited by examiner

ELECTRONIC DEVICE AND METHOD

BACKGROUND

Field of the Disclosure

Aspects of the disclosure generally relate to an electronic device capable of operating using power supplied from a power supply device, and to a method of controlling the electronic device.

Description of the Related Art

Universal Serial Bus (USB) Type-C standard and USB Power Delivery (PD) standard are known as standards relating to USB. A USB interface compliant with the USB PD standard can supply power at a maximum of 100 W.

Japanese Patent Laid-Open No. 2018-097643 discloses a power supply apparatus that performs an authentication communication to authenticate whether or not a USB cable is a predetermined cable.

When an electronic device that does not support the authentication communication such as that disclosed in Japanese Patent Laid-Open No. 2018-097643 is connected to a power supply device such as that disclosed in Japanese Patent Laid-Open No. 2018-097643, it is assumed that power supplied to the electronic device from the power supply device will be limited. In such a case, the electronic device may not be able to start or continue operating as desired by a user.

SUMMARY

According to various embodiments, there is provided an electronic device that is capable of limiting power supplied from a power supply device, and a method that controls the electronic device.

According to various embodiments, there is provided an electronic device that includes a communication unit that is capable of communicating with a power supply device; and a control unit that determines whether or not a predetermined message relating to an authentication communication is received from the power supply device via the communication unit, and controls the electronic device to limit operation of the electronic device in a case where the predetermined message is received from the power supply device via the communication unit.

According to various embodiments, there is provided a method that includes determining whether or not a predetermined message relating to an authentication communication is received from a power supply device via a communication unit of an electronic device; and controlling the electronic device to limit operation of the electronic device in a case where the predetermined message is received from the power supply device via the communication unit of the electronic device.

Further aspects of the disclosure will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
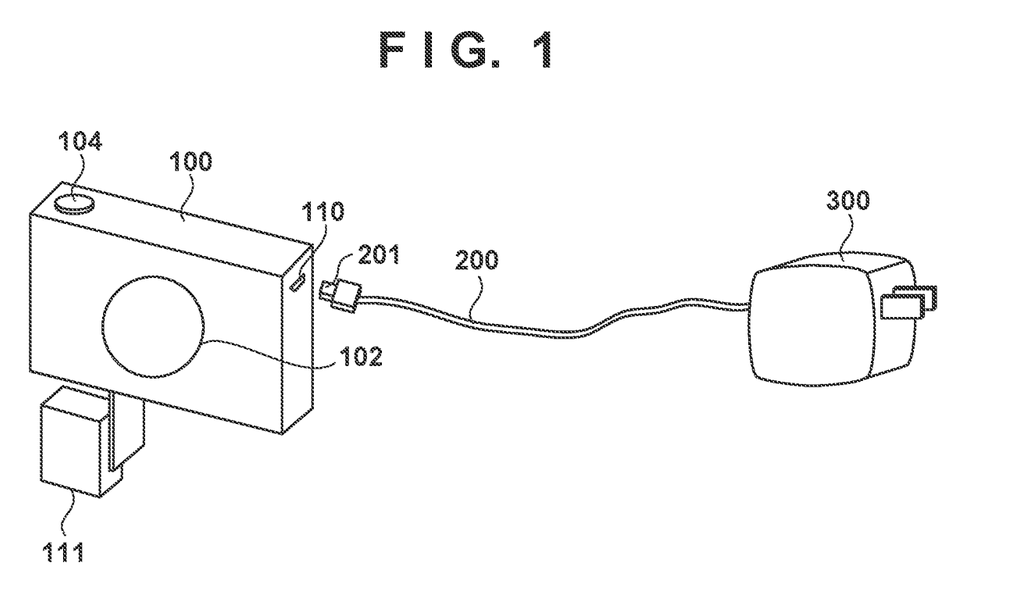
FIG. 1 is a diagram illustrating an example of the external appearance of a power supply system according to a first embodiment.

[First Embodiment] FIG. 1 is a diagram illustrating an example of the external appearance of a power supply system according to a first embodiment. As illustrated in FIG. 1, the power supply system includes an electronic device 100 and a power supply device 300. Both the electronic device 100 and the power supply device 300 are electronic devices compliant with the USB PD standard and the USB Type-C standard.

The electronic device 100 includes an image capture unit 102, an operation unit 104, and a connection unit 110. The electronic device 100 is an electronic device capable of operating using power supplied from the connection unit 110 or a battery 111. The electronic device 100 can operate as a sink according to the USB PD standard, but cannot operate as a responder according to the USB Type-C Authentication standard (called "C-Auth standard" hereinafter). The electronic device 100 is furthermore an electronic device that can operate as, for example, a digital camera, a digital video camera, a personal computer, a tablet computer, a media player, a PDA, a mobile phone, a smartphone, a game console, a robot, or a drone.

The power supply device 300 includes a USB cable 200, and supplies power to a power receiving device connected to a USB Type-C plug 201 provided at an end of the USB cable 200. Note that the power supply device 300 is an electronic device that can operate as a source according to the USB PD standard, and can operate as an initiator according to the C-Auth standard. The power supply device 300 can operate as, for example, a USB-AC adapter, a mobile battery, a personal computer, or a tablet computer.

Figure 2:
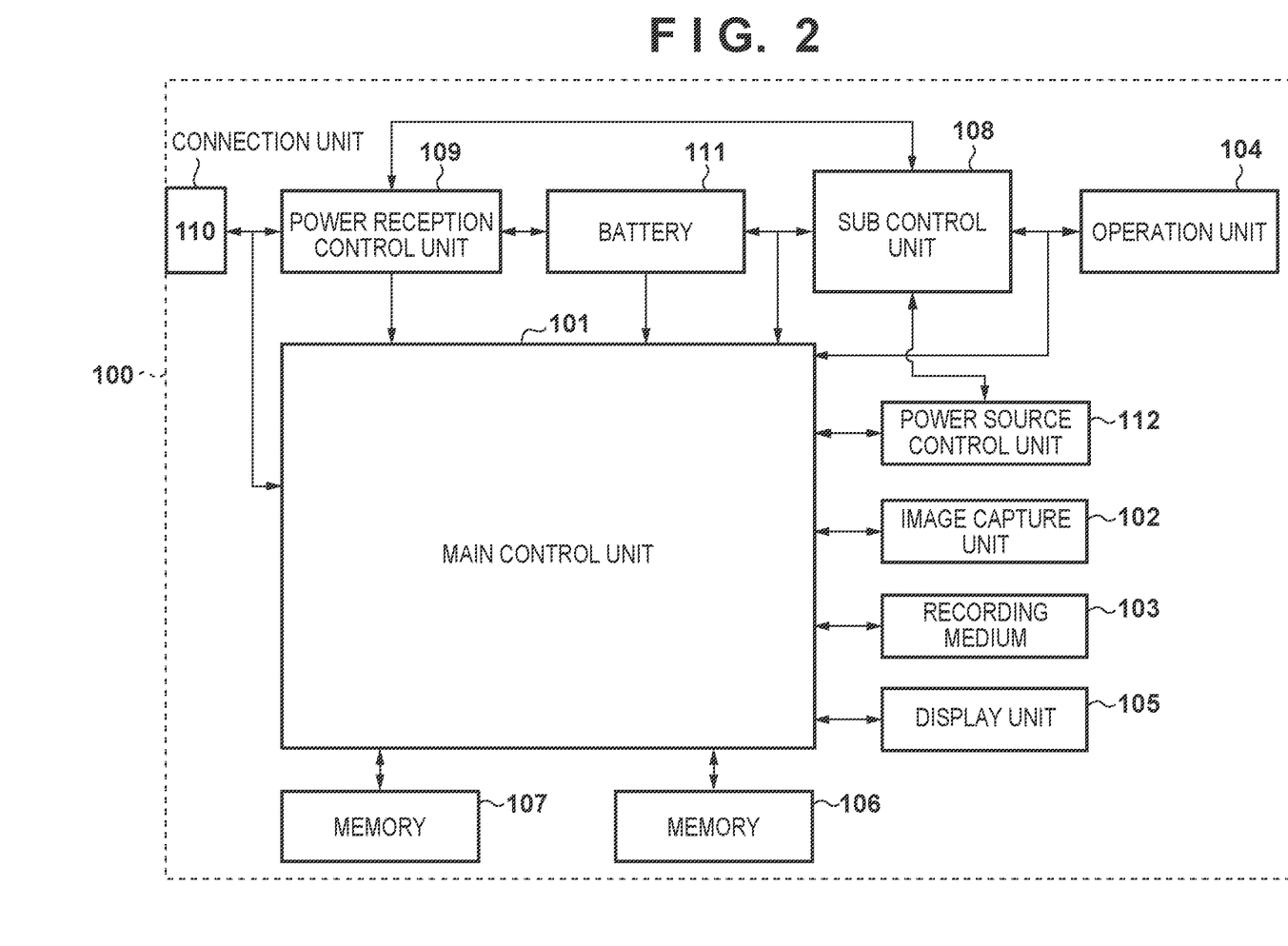
FIG. 2 is a block diagram illustrating an example of elements of an electronic device according to the first embodiment.

Elements of the electronic device 100 will be described next with reference to FIG. 2.

A main control unit 101 is configured to control the elements of the electronic device 100. The main control unit 101 includes, for example, a hardware processor (a CPU or the like) that controls the elements of the electronic device 100. The hardware processor of the main control unit 101 controls the elements of the electronic device 100 by executing programs stored in memory 107.

The image capture unit 102 includes a lens unit, an image sensor, related circuitry, and the like, and generates image data. Operation of the image capture unit 102 are controlled by the main control unit 101. The image data generated by the image capture unit 102 is stored in memory 106. The main control unit 101 performs a predetermined image process on the image data stored in the memory 106 and generates image data for display, image data for recording, and evaluation values. The image data for display is displayed in a display unit 105. The image data for recording is recorded into a recording medium 103.

The recording medium 103 is a memory card or a hard disk, for example. The recording medium 103 may be removable from the electronic device 100, or may be built into the electronic device 100.

The operation unit 104 is a collective name for input devices (buttons, switches, dials, a touch panel, or the like) provided for a user to input various types of instructions to the electronic device 100. Operations made using the operation unit 104 are detected by the main control unit 101, a sub control unit 108, or both. For example, the operation unit 104 includes a release switch, a moving image recording switch, a shooting mode selection dial for selecting a shooting mode, a menu button, a directional key, an OK key, or the like. The release switch is a switch for recording a still image, and the main control unit 101 and the sub control unit 108 recognize the release switch being in a half-pressed state as a shooting preparation instruction, and the release switch being in a fully-pressed state as a shooting start instruction. Additionally, the main control unit 101 and the sub control unit 108 recognize the moving image recording switch being pressed while in a shooting standby state as a moving image recording start instruction, and recognize the moving image recording switch being pressed while recording a moving image as a recording stop instruction. Note that the functions assigned to a given input device may be variable. Additionally, the input devices may include a software buttons or keys which use a touch screen.

The display unit 105 displays the image data generated by the image capture unit 102, information relating to settings or the status of the electronic device 100, menu screens, or the like. The display unit 105 may be a display apparatus connected to the electronic device 100.

The memory 106 is used as buffer memory that temporarily holds the image data generated by the image capture unit 102, video memory for the display unit 105, work memory for the main control unit 101, or the like. The memory 107 stores programs or the like that can be executed by the hardware processor of the main control unit 101.

The sub control unit 108 is configured to control the elements of the electronic device 100. The sub control unit 108 includes, for example, a hardware processor (a CPU or the like) that controls the elements of the electronic device 100, and memory storing programs that can be executed by the hardware processor. The sub control unit 108 can communicate with the main control unit 101 and can operate with a lower power consumption than the main control unit 101. The sub control unit 108 operates as a control unit that controls a power reception control unit 109.

The power reception control unit 109 supplies, to the elements of the electronic device 100, power which has been received through the connection unit 110. The power reception control unit 109 also controls charging of the battery 111 using power received through the connection unit 110. The power reception control unit 109 performs communication compliant with the USB PD standard (PD communication) with the power supply device 300 connected to the connection unit 110.

The connection unit 110 can operate as a USB interface. The electronic device 100 can receive power supplied from the power supply device 300 connected to the connection unit 110. Note that the power supply device 300 is capable of data communication, and the electronic device 100 may perform data communication with the power supply device 300. Note also that in the first embodiment, the connection unit 110 includes a USB Type-C receptacle and a USB device controller. The connection unit 110 may include an interface aside from a USB interface.

The battery 111 operates as a power source of the electronic device 100. The battery 111 is a battery which can be removed from the electronic device 100, and is a rechargeable battery. The charging of the battery 111 is controlled by the power reception control unit 109.

A power source control unit 112 controls the power supply from the battery 111 or the connection unit 110 to the other elements of the electronic device 100 under the control of the main control unit 101 or the sub control unit 108.

Elements of the power supply device 300 will be described next with reference to FIG. 3.

Figure 3:
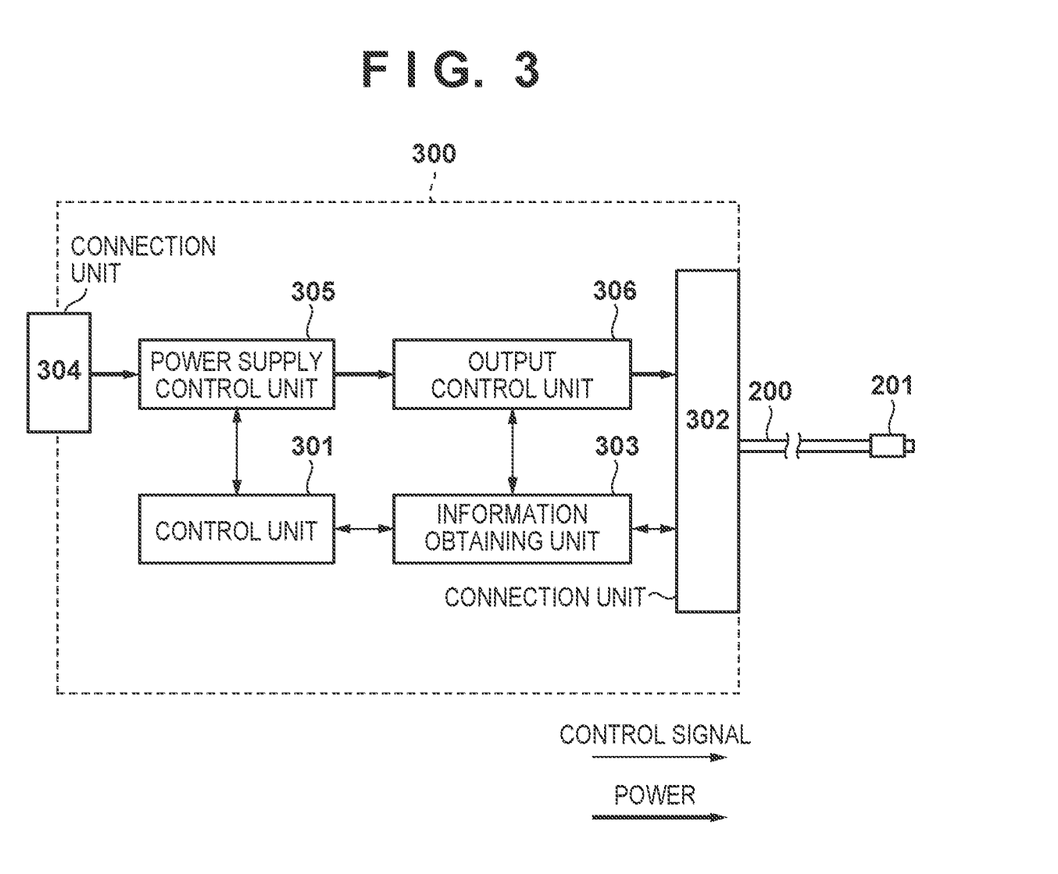
FIG. 3 is a block diagram illustrating an example of elements of a power supply device according to the first embodiment.

In FIG. 3, the flow of control signals is indicated by thin lines, and the flow of power is indicated by bold lines. The power supply device 300 can operate as a power supply side device (a source) according to the USB PD standard. The power supply device 300 can also operate as an initiator according to the C-Auth standard.

A control unit 301 is configured to control the elements of the power supply device 300. The control unit 301 includes, for example, a hardware processor (a CPU or the like) that controls the elements of the power supply device 300, and memory storing programs that can be executed by the hardware processor.

A connection unit 302 can operate as a USB interface, and the USB cable 200 is connected thereto. The USB Type-C plug 201 is provided on one end of the USB cable 200. The connection unit 302 includes a USB host controller.

An information obtaining unit 303 performs communication compliant with the USB PD standard (PD communication) with the electronic device 100 connected to the power supply device 300 by the USB cable 200. Furthermore, the information obtaining unit 303 performs communication compliant with the C-Auth standard (authentication communication or the like) with the electronic device 100.

A connection unit 304 is connected to a power source such as an AC outlet, a mobile battery, or the like. A power supply control unit 305 transforms a voltage and current supplied from a power source connected to the connection unit 304 into predetermined DC voltage and DC current (e.g., 9 V, 3 A). The DC voltage and the DC current which the power supply control unit 305 can generate are communicated to the electronic device 100 as power supply capabilities of the power supply device 300. The DC voltage and DC current generated by the power supply control unit 305 are controlled by the control unit 301.

An output control unit 306 is connected to a VBUS terminal of the connection unit 302. The output control unit 306 controls whether to supply the power generated by the power supply control unit 305 to, or cut that power off from, the VBUS terminal of the connection unit 302. The output control unit 306 furthermore controls a level of power supplied to the electronic device 100 based on information or a command obtained from the information obtaining unit 303.

Elements of the power reception control unit 109 will be described next with reference to FIG. 4.

Figure 4:
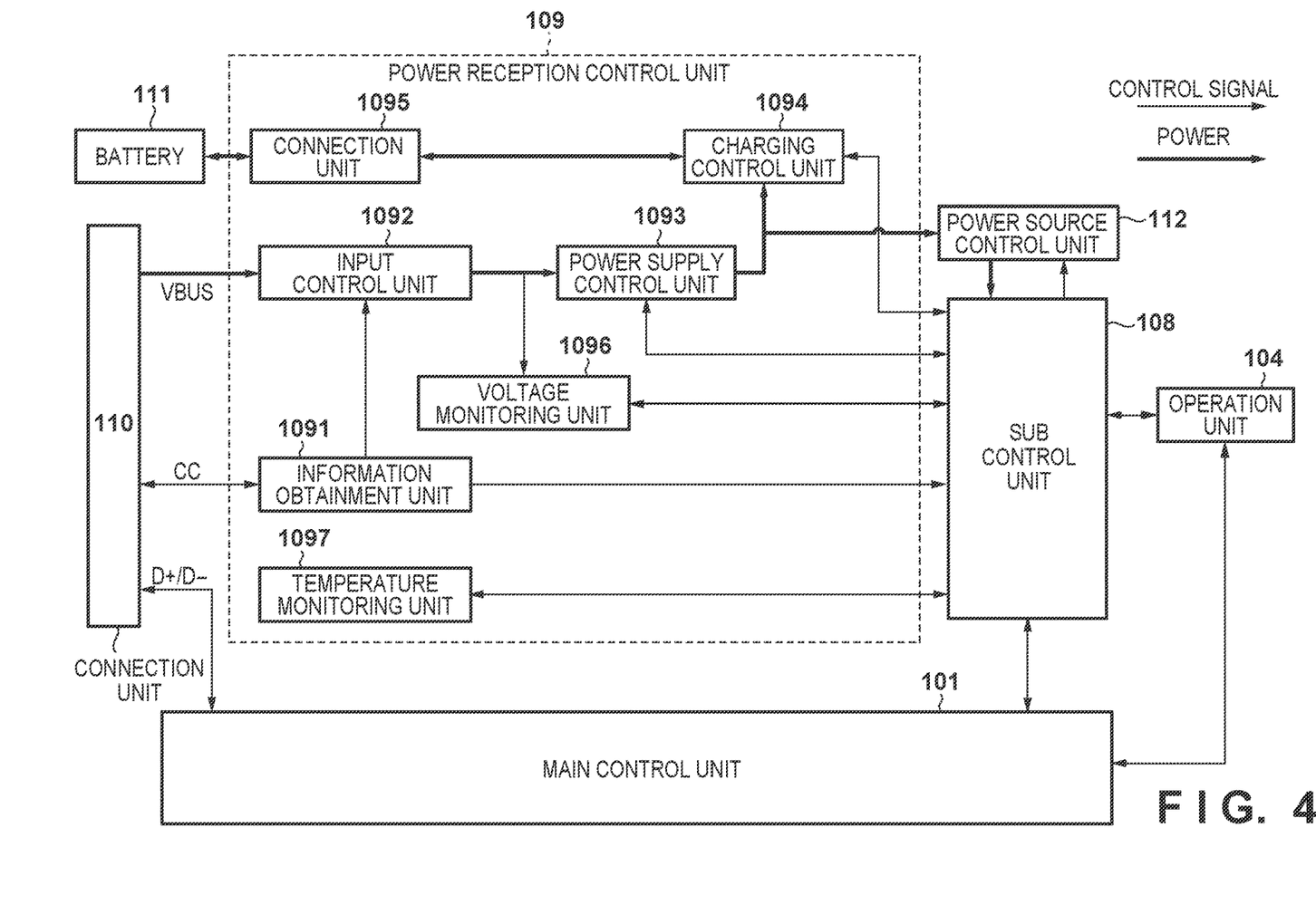
FIG. 4 is a block diagram illustrating elements of a power reception control unit according to the first embodiment.

In FIG. 4, the flow of control signals is indicated by thin lines, and the flow of power is indicated by bold lines. Note also that FIG. 4 focuses primarily on the flow of power supplied to the VBUS terminal, and does not illustrate the flow of power arising in a case where the electronic device 100 operates using the battery 111.

An information obtaining unit 1091 is connected to a CC (Configuration Channel) terminal of the connection unit 110. The information obtaining unit 1091 performs PD communication with the power supply device 300 connected to the connection unit 110. The information obtaining unit 1091 detects that the power supply device 300 is a source according to the USB PD standard based on a voltage at the CC terminal, and requests the power supply device 300 supply a specified power through PD communication.

An input control unit 1092 is connected to the VBUS terminal of the connection unit 110. The input control unit 1092 receives power from the power supply device 300 through the VBUS terminal. Additionally, under the control of the information obtaining unit 1091, the input control unit 1092 can switch between supplying power to and cutting off power from a power supply control unit 1093.

The power supply control unit 1093 transforms power supplied through the input control unit 1092 into power suited to the power source control unit 112 and a charging control unit 1094. In a case where, for example, power is supplied at 5 V or 9 V, the power supply control unit 1093 drops the power down to an appropriate cell voltage. The first embodiment assumes that the battery 111 is a single-cell lithium-ion battery, and that CCCV charging is performed, in which after charging the cell voltage to 4.2 V using a constant current, the battery 111 is charged at 4.2 V until fully charged. The power supply control unit 1093 may be configured to be capable of stepping up or stepping down in accordance with the number of cells in the battery 111, the voltage supplied, and so on. In a case where the battery 111 is not attached, the power supply control unit 1093 transforms power supplied via the input control unit 1092 to a voltage having the highest efficiency (e.g., 3.7 V) in the power source control unit 112.

The power supply control unit 1093 can also limit the supplied current in accordance with an instruction from the sub control unit 108 based on capability information of the power supply device 300, obtained by the information obtaining unit 1091. For example, if 27 W (9 V, 3 A) of power is supplied from the power supply device 300, the power supply control unit 1093 can limit the current flowing so as not to exceed 3.0 A.

The charging control unit 1094 can charge the battery 111 connected to a connection unit 1095 with power supplied via the power supply control unit 1093. The charging control unit 1094 charges the battery 111 using CCCV charging, for example.

The connection unit 1095 holds the battery 111 in a removable manner, for example. The connection unit 1095 includes terminals that contact terminals of the battery 111 which is held, such as a power supply terminal, a GND terminal, and a thermistor terminal. The thermistor terminal is a terminal for a temperature sensor built into the battery 111.

A voltage monitoring unit 1096 notifies the sub control unit 108 of a voltage at the VBUS terminal. The sub control unit 108 monitors whether or not the voltage notified by the voltage monitoring unit 1096 is anomalous. For example, if the power requested of the power supply device 300 is 27 W (9V, 3 A), the sub control unit 108 monitors whether the voltage notified by the voltage monitoring unit 1096 is too high (e.g., 15 V) or too low. Then, upon detecting an anomalous voltage of the VBUS terminal, the sub control unit 108 stops, the input control unit 1092 and requests the power supply device 300 to stop power supply through the information obtaining unit 1091, for example.

Note that FIG. 4 illustrates the voltage monitoring unit 1096 monitoring the voltage between the input control unit 1092 and the power supply control unit 1093. However, the voltage at another location may be monitored, such as monitoring the voltage between the connection unit 110 and the connection unit 1095.

A temperature monitoring unit 1097 notifies the sub control unit 108 of a temperature in the vicinity of the connection unit 110. The sub control unit 108 monitors whether or not the temperature monitoring unit 1097 has detected an anomalous temperature. For example, in a case where the temperature monitoring unit 1097 makes a notification of a temperature exceeding a predetermined threshold, the sub control unit 108 stops the input control unit 1092 and requests the power supply device 300 to stop power supply through the information obtaining unit 1091, for example.

Figure 5:
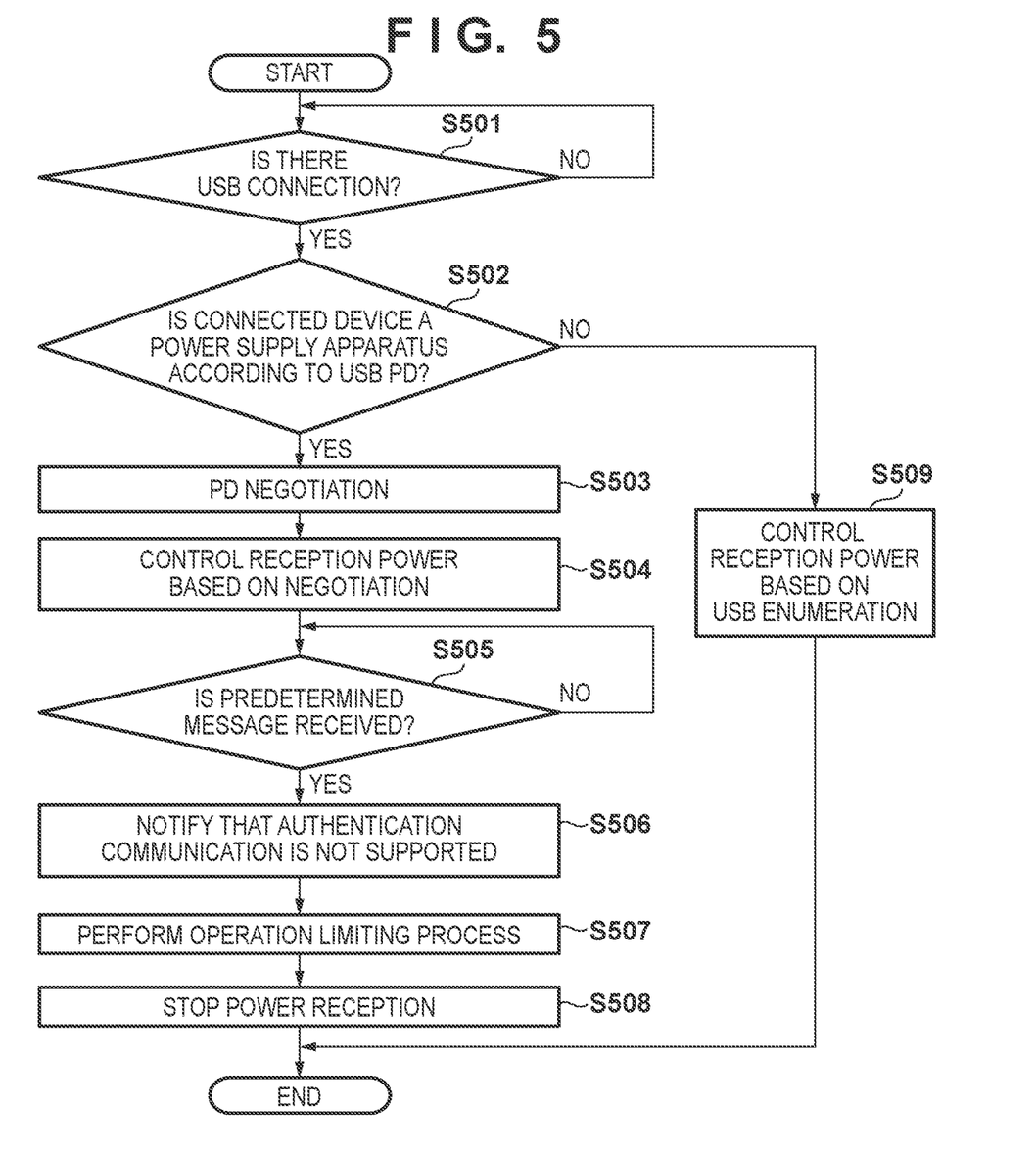
FIG. 5 is a flowchart illustrating a power reception control process according to the first embodiment.

A power reception control process according to the first embodiment will be described next with reference to the flowchart in FIG. 5.

In step S501, the sub control unit 108 determines whether or not the power supply device 300 has been connected to the connection unit 110 via USB. This determination process may be based on the detection of the VBUS voltage by the voltage monitoring unit 1096, or may be based on the detection of the voltage at the CC terminal by the information obtaining unit 1091. In a case where the power supply device 300 is determined to be connected to the connection unit 110 via USB, the sub control unit 108 performs the process of step S502.

In step S502, the sub control unit 108 determines whether or not the power supply device 300 is a source according to the USB PD standard. In a case where the power supply device 300 is determined to be a source, the sub control unit 108 performs the process of step S503. In a case where the power supply device 300 is determined not to be a source, the sub control unit 108 performs the process of step S507. The sub control unit 108 can determine that the power supply device 300 is a source in a case where the information obtaining unit 1091 receives a message indicating the power supply capabilities of the power supply device 300 (e.g., Source_Capabilities) from the power supply device 300 (the information obtaining unit 303). On the other hand, the sub control unit 108 can determine that the power supply device 300 is not a source in a case where the message has not been received from the power supply device 300 within a predetermined amount of time after the power supply device 300 is detected as having been connected.

In step S503, the sub control unit 108 determines the power to be requested from the power supply device 300 based on the power supply capabilities of the power supply device 300 indicated in the message obtained in step S502. The sub control unit 108 determines the power to be requested from the power supply device 300 by selecting a power required by the electronic device 100 to operate from among options for powers which the power supply device 300 is capable of supplying, for example. If the power supply device 300 cannot supply the power needed to implement all the functions of the electronic device 100, the sub control unit 108 may limit the operation of the electronic device 100 to a scope that can be implemented using power from the power supply device 300. The sub control unit 108 causes the information obtaining unit 1091 to perform PD communication (PD negotiation) for requesting the power which has been determined.

In step S504, the sub control unit 108 controls the power supply control unit 1093 so that the power received from the VBUS terminal of the connection unit 110 is less than or equal to the power determined in step S503.

In a case where the power supply device 300 receives the request sent in step S503, a message indicating that the request has been received is received by the information obtaining unit 1091. The supply of the requested power to the VBUS terminal is also started. The sub control unit 108 may control the charging control unit 1094 to charge the battery 111 using power supplied to the VBUS terminal, cause the electronic device 100 to perform a predetermined operation by supplying, to the power source control unit 112, power supplied to the VBUS terminal, and so on.

In a case where the power supply device 300 can operate as an initiator according to the C-Auth standard, the power supply device 300 performs an authentication communication to authenticate whether or not the device is compliant with the USB PD standard. The power supply device 300 can perform the authentication communication at any desired timing. Accordingly, after controlling the power supply control unit 1093 in accordance with the requested power in step S504, the sub control unit 108 monitors whether or not the information obtaining unit 1091 has received a predetermined message relating to the authentication communication (e.g., Security_Request) from the power supply device 300 (step S505).

While the information obtaining unit 1091 is not receiving the predetermined message relating to the authentication communication from the power supply device 300, the sub control unit 108 can use power supplied to the VBUS terminal to operate the electronic device 100 and charge the battery 111.

In step S505, upon detecting that the information obtaining unit 1091 has received the predetermined message relating to the authentication communication from the power supply device 300, the sub control unit 108 performs the process of step S506.

In step S506, the sub control unit 108 sends a message indicating that the electronic device 100 does not support the authentication communication (e.g., Not_Supported) to the power supply device 300 through the information obtaining unit 1091. As a result, the power supply device 300 is notified that the electronic device 100 does not support the authentication communication. Additionally, the sub control unit 108 notifies the main control unit 101 that the predetermined message has been received.

Next, in step S507, the main control unit 101 limits the operation of the electronic device 100 on the assumption that the power supply device 300 will limit or stop power supply. For example, the main control unit 101 terminates an operation which cannot be continued in a case where power supplied from the power supply device 300 is limited. For example, if the electronic device 100 is shooting a moving image, the shooting is stopped, and the moving image data which has been shot is stored in the recording medium 103. The main control unit 101 may perform a process for shutting down the electronic device 100. If the operation limitation is complete, the main control unit 101 sends a notification to the sub control unit 108.

In step S508, the sub control unit 108 causes the input control unit 1092 to send a message that requests to stop power supply, to the power supply device 300. The power supplied from the power supply device 300 is stopped as a result. If the shutdown process is not performed in step S507, the electronic device 100 operates using power from the battery 111.

In step S509, the sub control unit 108 controls the power supply control unit 1093 to support the reception of bus power as defined by the USB 1.1 to 3.2 standards instead of the USB PD standard. The bus power may be power based on the result of an enumeration procedure performed when the USB connection is made, and is, for example, 5 V, 100 mA, 5 V, 500 mA, or the like.

For example, the sub control unit 108 may determine whether to operate the electronic device 100 using power supplied to the VBUS terminal or using the battery 111 based on an operating mode of the electronic device 100, whether the battery 111 is connected to the electronic device 100, the voltage of the battery 111, or the like. For example, in a case where the battery 111 is not connected to the electronic device 100, or in a case where the voltage of the battery 111 is low, the electronic device 100 can be operated using power supplied to the VBUS terminal (bus power). In this case, the sub control unit 108 may limit the operation of the electronic device 100 such that the electronic device 100 can operate with bus power.

As described thus far, according to the first embodiment, in a case where an electronic device 100 that does not support the authentication communication has received a predetermined message relating to the authentication communication from a power supply device 300, the operation of the electronic device 100 are limited. For example, operation that is undesirable to be unintentionally interrupted (such as data recording operation) can be terminated or limited from being performed. Accordingly, even if the power supply device 300 limits (including stopping) power supply based on a failure in the authentication communication, the impact on the operation of the electronic device 100 can be reduced.

[Second Embodiment] A second embodiment will be described next with reference to FIGS. 1 to 6. The first embodiment describes an example in which in a case where the electronic device 100 receives a predetermined message relating to the authentication communication from the power supply device 300, the operation of the electronic device 100 are limited regardless of the state of the electronic device 100. The second embodiment will describe an example in which in a case where the electronic device 100 receives a predetermined message relating to the authentication communication from the power supply device 300, whether or not to limit the operation of the electronic device 100 (or whether or not to request the power supply device 300 to limit or stop power supply) is controlled in accordance with an operation state of the electronic device 100. Note that the second embodiment will describe parts different from the first embodiment, and will not describe parts that are the same as in the first embodiment.

Figure 6:
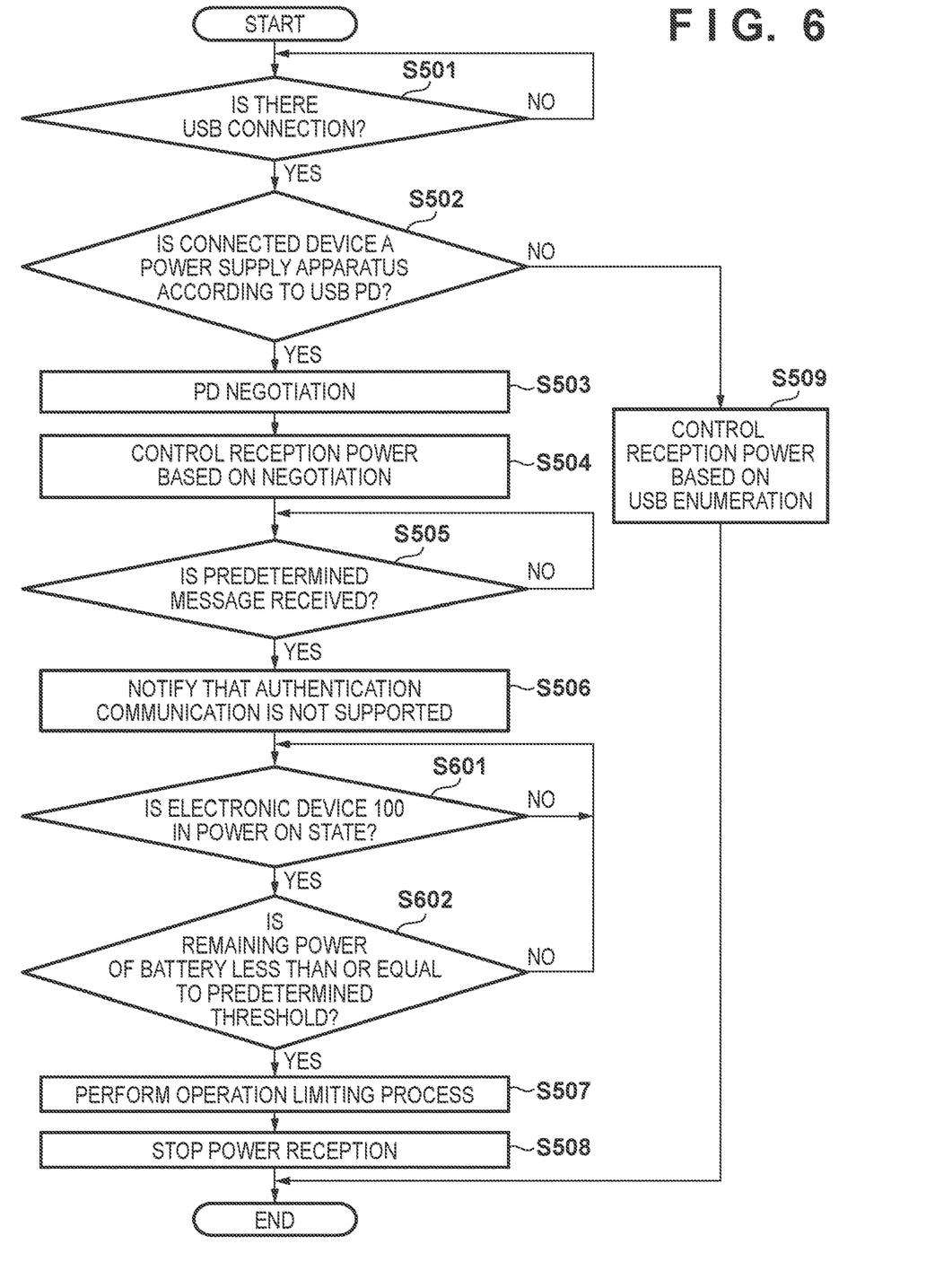
FIG. 6 is a flowchart illustrating a power reception control process according to a second embodiment.

FIG. 6 is a flowchart illustrating a power reception control process according to the second embodiment.

The processes of steps S501 to S509 are the same as the processes described in the first embodiment, and will therefore not be described here. In a case where a message indicating that the authentication communication is not supported (e.g., Not_Supported) has been sent to the power supply device 300 in step S506, the sub control unit 108 performs the process of step S601.

In step S601, the sub control unit 108 determines whether or not the electronic device 100 is in power on state. This determination process can be performed based on the state of a power switch included in the operation unit 104, for example. In a case where the electronic device 100 is determined to be in power on state, the sub control unit 108 performs the process of step S602. In a case where the electronic device 100 is not determined to be in power on state, the sub control unit 108 repeats the process of step S601.

In a case where the electronic device 100 is not determined to be in power on state (i.e., in a case where the electronic device 100 is in power off state), the bus power is used for operations which would not be affected even if power supply is stopped, such as charging the battery 111. Accordingly, the sub control unit 108 maintains the current power reception state without requesting the power supply device 300 to stop power supply.

In step S602, the sub control unit 108 determines whether or not the remaining power of the battery 111 is less than or equal to a predetermined threshold. The predetermined threshold is, for example, the minimum remaining power at which the electronic device 100 can operate, without limitations, using power from the battery 111. In a case where the remaining power of the battery 111 is not determined to be less than or equal to the predetermined threshold, the sub control unit 108 maintains the current power reception state without requesting the power supply device 300 to stop power supply. This is because in a case where the remaining power of the battery 111 is not determined to be less than or equal to the predetermined threshold, the operation of the electronic device 100 can be continued using power from the battery 111 even if power supplied from the power supply device is stopped. Accordingly, the sub control unit 108 performs the process of step S601 again. In a case where the remaining power of the battery 111 is determined to be less than or equal to the predetermined threshold, the sub control unit 108 performs the process of step S507.

According to the second embodiment, in a case where a predetermined message relating to the authentication communication is received from the power supply device 300, whether or not to limit the operation of the electronic device 100 (or whether or not to request the power supply device 300 to limit or stop power supply) can be controlled in accordance with an operation state of the electronic device 100. For example, in a case where the electronic device 100 is in power off state or in a case where the remaining power of the battery 111 is not less than or equal to a predetermined threshold, the operation of the electronic device 100 may not be limited and the power supply device 300 may not be requested to limit or stop the power supply. Accordingly, in the second embodiment, the electronic device 100 can even more effectively use power supplied from the power supply device 300.

[Third Embodiment] The various functions, processes, or methods described in the first or second embodiment can also be achieved by a personal computer, a microcomputer, a Central Processing Unit (CPU), or a microprocessor executing a program. In a third embodiment, described hereinafter, the personal computer, the microcomputer, the Central Processing Unit (CPU), or the microprocessor will be called a "computer X". Also, in the third embodiment, a program for controlling the computer X and implementing the various functions, processes, or methods described in the first or second embodiment will be called a "program Y".

The various functions, processes, or methods described in the first or second embodiment are realized by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, volatile memory (e.g., random access memory), non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-108997, filed on Jun. 24, 2020, which is hereby incorporated by reference herein in its entirety.

What is claimed is:

1. An electronic device comprising:
a connector;
a CPU; and
a memory that stores a program which, when executed by the CPU, causes the electronic device to function as:
a communication unit that communicates with a power supply device connected via the connector;
a power receiving unit that receives power from the power supply device; and
a control unit that requests, via the communication unit, the power supply device to supply a requested amount of power, controls the power receiving unit so as to receive the requested power from the power supply device, and controls the electronic device to perform an operation of the electronic device using the requested power from the power supply device,
wherein the requested power is determined based on information received from the power supply device indicating power supply capabilities of the power supply device,
wherein an authentication communication is performed by the power supply device connected to the connector in a case where the power supply device connected to the connector supports the authentication communication, and the electronic device does not support the authentication communication, and
wherein, in accordance with a reception of a predetermined message relating to the authentication communication from the power supply device while the electronic device performs the operation using the requested power supplied from the power supply device, the control unit controls the electronic device to limit the operation of the electronic device to a range that requires less amount of power than the requested power.

2. The electronic device according to claim 1, wherein the control unit controls the electronic device to limit the operation of the electronic device by terminating an operation that cannot be continued in a case where power supplied from the power supply device is limited to be lower than the requested power.

3. The electronic device according to claim 1, wherein the control unit controls the electronic device to limit the operation of the electronic device by performing a process of shutting down the electronic device.

4. The electronic device according to claim 1, wherein the control unit sends via the communication unit to the power supply device a message 6 indicating that the electronic device does not support the authentication communication, in accordance with the reception of the predetermined message.

5. The electronic device according to claim 1, wherein the control unit controls the electronic device not to limit the operation of the electronic device to the range that requires less amount of power than the requested power if the predetermined message is received by the communication unit during the electronic device is in a power off state.

6. The electronic device according to claim 1, wherein the control unit controls the electronic device not to limit the operation of the electronic device to the range that requires less amount of power than the requested power even if the predetermined message is received by the communication unit when a remaining power of a battery connected to the electronic device is higher than a predetermined threshold.

7. The electronic device according to claim 1, wherein after the operation of the electronic device is limited, the control unit requests the power supply device to limit or stop power supply via the communication unit.

8. The electronic device according to claim 1, wherein the electronic device complies with USB Power Delivery standard, the control unit determines the requested amount of power to be requested to the power supply device based on the information received from the power supply device in a case where the power supply device is compliant with USB Power Delivery standard and requests the determined power to the power supply device via the communication unit, the authentication communication is compliant with USB Type-C Authentication, and the electronic device is not compliant with USB Type-C Authentication.

9. The electronic device according to claim 1, wherein the electronic device is capable of operating as a Sink of USB Power Delivery standard and is not capable of operating as a Responder of USB Type-C Authentication specification, the power supply device is capable of operating as a Source of USB Power Delivery standard and is capable of operating as an Initiator of USB Type-C Authentication specification, and the authentication communication is compliant with USB Type-C Authentication.

10. The electronic device according to claim 1, wherein the electronic device is an image capturing apparatus, and wherein, in accordance with the reception of the predetermined message while the electronic device is performing a shooting of a moving image, the control unit controls the electronic device to stop the shooting of the moving image.

11. A method performed by an electronic device, comprising:

requesting, via a communication unit, a power supply device connected to a connector to supply a requested amount of power, wherein the requested power is determined based on information received from the power supply device indicating power supply capabilities of the power supply device; and performing an operation using the requested power from the power supply device, wherein an authentication communication is performed by the power supply device connected to the connector in a case where the power supply device connected to the connector supports the authentication communication, and the electronic device does not support the authentication communication, and wherein, in accordance with a reception of a predetermined message relating to the authentication communication from the power supply device while the electronic device performs the operation using the requested power supplied from the power supply device, limiting the operation to a range that requires less amount of power than the requested power.

12. A non-transitory storage medium that stores a program causing a computer to execute a method, the method comprising:

requesting, via a communication unit, a power supply device connected to a connector to supply a requested amount of power, wherein the requested power is determined based on information received from the power supply device indicating power supply capabilities of the power supply device; and performing an operation using the requested power from the power supply device, wherein an authentication communication is performed by the power supply device connected to the connector in a case where the power supply device connected to the connector supports the authentication communication, and the electronic device does not support the authentication communication, and wherein, in accordance with a reception of a predetermined message relating to the authentication communication from the power supply device while the electronic device performs the operation using the requested power supplied from the power supply device, limiting the operation to a range that requires less amount of power than the requested power.

* * * * *